United States Patent
Gordon

(10) Patent No.: US 8,349,218 B2
(45) Date of Patent: *Jan. 8, 2013

(54) TEMPERATURE SWITCH

(75) Inventor: Alexandra Georgina Redcliffe Gordon, Nottingham (GB)

(73) Assignee: Kidde IP Holdings Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,103

(22) Filed: Mar. 15, 2011

(65) Prior Publication Data

US 2011/0163841 A1  Jul. 7, 2011

Related U.S. Application Data

(60) Continuation of application No. 12/148,484, filed on Apr. 17, 2008, now Pat. No. 7,947,200, which is a division of application No. 11/583,207, filed on Oct. 18, 2006, now Pat. No. 7,857,996.

(30) Foreign Application Priority Data

Oct. 19, 2005 (GB) .................................. 0521287.3

(51) Int. Cl.
*H01B 1/00* (2006.01)
(52) U.S. Cl. ...................... 252/500; 252/299.4; 252/364; 252/408.1; 252/512; 210/634; 524/418
(58) Field of Classification Search ............... 252/299.4, 252/364, 408.1, 500, 512; 210/634; 335/208; 337/320; 424/9.2; 428/323, 457; 430/617; 524/418

See application file for complete search history.

(56) References Cited

U.S. PATENT DOCUMENTS

| | | | |
|---|---|---|---|
| 3,334,109 A | 8/1967 | Harris | |
| 4,023,128 A | 5/1977 | Itou et al. | |
| 4,065,741 A | 12/1977 | Sakamoto et al. | |
| 4,202,799 A | 5/1980 | Yoshimura | |
| 4,206,308 A | 6/1980 | Murakami et al. | |
| 4,384,267 A | 5/1983 | Aoki | |
| 4,408,178 A | 10/1983 | Hanssen et al. | |
| 4,610,552 A | 9/1986 | Kobayashi et al. | |
| 4,731,449 A | 3/1988 | Jonas et al. | |
| 4,849,520 A | 7/1989 | Kossmehl | |
| 5,827,602 A | 10/1998 | Koch et al. | |
| 6,245,847 B1 * | 6/2001 | Green et al. | ................. 524/418 |
| 6,749,336 B2 | 6/2004 | Wu et al. | |

(Continued)

FOREIGN PATENT DOCUMENTS

DE  36 01 307 A1  7/1987

(Continued)

OTHER PUBLICATIONS

Yoshio Kishimoto et al., "The Thermal Stability of Metal Cation-TCNQ Anion Radical Salts," The Chemical Society of Japan, Jun. 1980, vol. 53, No. 6, pp. 1723-1727.

(Continued)

*Primary Examiner* — Khanh Tuan Nguyen
(74) *Attorney, Agent, or Firm* — Merchant & Gould P.C.

(57) ABSTRACT

A temperature switch comprises a material (14) which melts and concomitantly undergoes a change in an electrical characteristic at a predetermined temperature. The temperature switch also includes at least two electrical contacts (10, 12) for detecting the change in the electrical characteristic. The material (14) comprises an organic cation and an anion and is preferably an ionic liquid.

18 Claims, 1 Drawing Sheet

U.S. PATENT DOCUMENTS

| | | |
|---|---|---|
| 6,852,229 B2 | 2/2005 | Mehnert et al. |
| 7,033,674 B2 | 4/2006 | Thorp et al. |
| 7,163,786 B1 | 1/2007 | Sakizadeh et al. |
| 7,857,996 B2 | 12/2010 | Gordon |
| 2004/0180224 A1 | 9/2004 | Thorp et al. |
| 2005/0005840 A1 | 1/2005 | Bonrath |
| 2006/0257645 A1* | 11/2006 | Asaka et al. .................. 428/323 |
| 2007/0021604 A1 | 1/2007 | Deng et al. |
| 2007/0085062 A1 | 4/2007 | Gordon |
| 2008/0008930 A1 | 1/2008 | Matsumoto et al. |
| 2008/0044357 A1 | 2/2008 | Wang et al. |
| 2008/0191170 A1 | 8/2008 | Walker |
| 2008/0192801 A1 | 8/2008 | Gordon |

FOREIGN PATENT DOCUMENTS

| | | |
|---|---|---|
| DE | 36 35 836 A1 | 4/1988 |
| GB | 1190671 | 5/1970 |
| GB | 1326752 | 8/1973 |
| JP | 10-125192 | 5/1998 |
| JP | 2000-76971 | 3/2000 |
| WO | WO 03/058185 A1 | 7/2003 |

OTHER PUBLICATIONS

McGraw-Hill Dictionary of Scientific and Technical Terms, 6$^{th}$ Edition (2002), 3 pages.

Grant & Hackh's Chemical Dictionary (Containing the Words Generally Used in Chemistry, and Many of the Terms Used in the Related Sciences of Physics, Medicine, Engineering, Biology, Pharmacy, Astrophysics, Agriculture, Mineralogy, etc.), 5$^{th}$ Edition (1987), 3 pages.

Darrell D. Ebbing, General Chemistry, 5$^{th}$ Edition (1996), 3 pages.

"What are ionic liquids?," http://web.archive.org/web/20050524141317/http://lem.ch.unito.it/didattica/infochimica/Liquidi+Ionici/Definition.html, 4 pages (Retrieved on Jan. 26, 2007).

U.S. Appl. No. 60/635,905 also published as PCT/CNO5/02175 (Wang et al.) filed Dec. 13, 2004.

* cited by examiner

TEMPERATURE SWITCH

REFERENCE TO RELATED APPLICATIONS

This application is a continuation application of U.S. patent application Ser. No. 12/148,484, filed on Apr. 17, 2008, now U.S. Pat. No. 7,947,200, which is a divisional application of U.S. patent application Ser. No. 11/583,207, filed on Oct. 18, 2006, now U.S. Pat. No. 7,857,996, which claims the benefit of GB application Ser. No. 0521287.3, filed on Oct. 19, 2005, each of which is incorporated herein by reference in its entirety.

TECHNICAL FIELD

The invention relates to a temperature switch.

BACKGROUND

A known temperature switch comprises an electrically conductive sheath and an electrically conductive wire positioned within the sheath so as to be spaced from (that is to say not in contact with) the sheath. A solid eutectic salt mixture lies between the sheath and the wire and is in contact with both the sheath and the wire. The eutectic salt mixture is selected so as to melt at a desired threshold temperature. At temperatures below the threshold temperature, the solid eutectic salt mixture is poorly electrically conductive (it has a high electrical impedance). However, on melting, the eutectic salt mixture undergoes a large increase in electrical conductivity (that is to say its electrical impedance decreases). In use, the conductive sheath and the conductive wire act as electrical contacts for detecting the change in conductivity/impedance of the eutectic salt mixture which lies between the sheath and the wire. The change in conductivity/impedance is detected by suitable electronics connected to the sheath and the wire.

SUMMARY

In accordance with the invention, there is provided a temperature switch comprising a material which melts and concomitantly undergoes a change in an electrical characteristic at a predetermined temperature, and at least two electrical contacts for detecting the change in the electrical characteristic, the material comprising an organic cation and an anion.

BRIEF DESCRIPTION OF THE DRAWINGS

The following is a more detailed description, by way of example only, of temperature switches in accordance with the invention, reference being made to the appended drawings in which.

DETAILED DESCRIPTION

Figure 1:
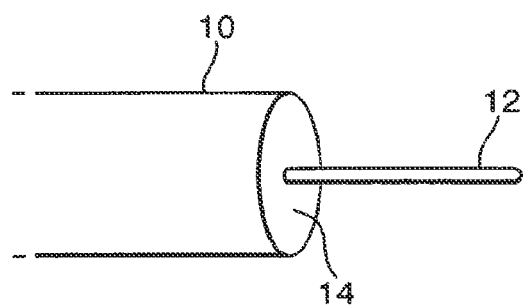
FIG. 1 is a schematic view of a temperature switch.

Referring to FIG. 1, the temperature switch comprises an electrically conductive sheath 10, an electrically conductive wire 12 and an ionic liquid 14. As seen in FIG. 1, the electrically conductive wire 12 passes centrally through the conductive sheath 10. The conductive wire 12 is spaced from, and so does not touch, the conductive sheath 10. In order to ensure that the conductive wire 12 does not contact the conductive sheath 10, a porous spacing material (not shown) may be provided around the conductive wire 12.

As used herein, the term "ionic liquid" refers to a salt consisting of an organic cation and an anion. The anion may be either inorganic or organic. Despite the name, ionic liquids are not necessarily liquids at room temperature. However, they may have relatively low melting points compared to inorganic salts. For example an ionic liquid may have a melting point less than 200° C. Also, at least one of the component ions of the ionic liquid may have a delocalised charge. The ionic liquid 14 shown in FIG. 1 is contained within the conductive sheath 10 and lies between the conductive wire 12 and the conductive sheath 10. The ionic liquid 14 is in contact with both the conductive wire 12 and the conductive sheath 10 and provides a continuous electrical pathway between the wire 12 and the sheath 10. The ionic liquid 14 has a melting point at a threshold temperature which is higher than the temperature to which the temperature switch is normally exposed. Below the threshold temperature, the ionic liquid 14 exists in a solid state and has a relatively low electrical conductivity (a high impedance). Above the threshold temperature, the ionic liquid 14 exists in a liquid state and has a relatively high electrical conductivity (low impedance). If a porous spacing material is provided around the conductive wire 12 as described above, then the ionic liquid 14 fills the pores of the spacing material so as to provide a continuous electrical path between the conductive wire 12 and the conductive sheath 10.

There are a very large number of known ionic liquids. Many of these may be capable of being used in the temperature switch, although some are more preferred than others. As already stated, an ionic liquid consists of an organic cation and an anion. Examples of suitable cations and anions are disclosed in detail in WO03/058185 and U.S. Pat. No. 5,827,602.

Examples of preferred cations for the ionic liquid 14 are: imidazolium; substituted forms of imidazolium; pyridinium; substituted forms of pyridinium; pyrrolidinium; substituted forms of pyrrolidinium; phosphonium; substituted forms of phosphonium; ammonium; substituted forms of ammonium; guanidinium; substituted forms of guanidinium; uronium; substituted forms of uronium; thiouronium; and substituted forms of thiouronium. A substituted form of phosphonium which is particularly preferred is tetraalkyl phosphonium. A substituted form of ammonium which is particularly preferred is tetraalkyl ammonium.

The substituted cations may have, by way of example only, in place of hydrogen, one or more of the following substituent groups: fluorine; alkyl groups of one or more carbon atoms; alkylene groups of two or more carbon atoms; phenyl groups; and alkoxy groups. Alkyl, alkylene, phenyl and alkoxy substituents may themselves be substituted with, by way of example, one or more of the following electron withdrawing groups: F—; Cl—; $CF_3$—; $C_2F_5$—; $CF_3S$—; $(CF_3)_2CHS$—; and $(CF_3)_3CS$—.

Preferred anions for the ionic liquid 14 are: sulphate; substituted forms of sulphate; sulphonate; substituted forms of sulphonate; halides; amide; substituted forms of amide; imide; substituted forms of imide; tosylate; substituted forms of tosylate; borate; substituted forms of borate; phosphate; substituted forms of phosphate; antimonate; substituted forms of antimonate; carboxylate; and substituted forms of carboxylate. A preferred substituted form of sulphate is alkylsulphate.

The substituted polyatomic anions, e.g. tosylates, phosphates, sulphates etc. may, by way of example only, have, in place of hydrogen, one or more of the following substituent groups: fluorine; alkyl groups of one or more carbon atoms; alkylene groups of two or more carbon atoms; phenyl groups; and alkoxy groups. The alkyl, alkylene, phenyl and alkoxy groups may themselves be halogenated.

Any ionic liquid, including any combination of a preferred cation from the list given above with a preferred anion from the list given above, is a potential candidate for the ionic liquid 14 of the temperature switch. However, the ionic liquid chosen for the temperature switch should, of course, have a melting point at a temperature which is suitable for the application in mind. For many applications, the temperature switch will be used to provide a warning signal when the temperature to which the temperature switch is exposed reaches or exceeds a predetermined threshold temperature. For any such application an ionic liquid should be chosen which has a melting point at or close to the desired threshold temperature. For many applications, the temperature switch preferably has an ionic liquid 14 with a melting point below 200° C. and more preferably at or below 120° C. Melting points in the range of from 80° C. to 120° C. are particularly preferred for some applications.

In addition to an appropriate melting point, there are a number of characteristics which are preferred characteristics of the ionic liquid 14 of the temperature switch.

Firstly, the ionic liquid 14 preferably has a well defined, sharp melting point. The presence of this characteristic can be readily determined by trial and error. A sharp melting point is favoured by a crystalline, ionic solid state and high purity.

Figure 2:
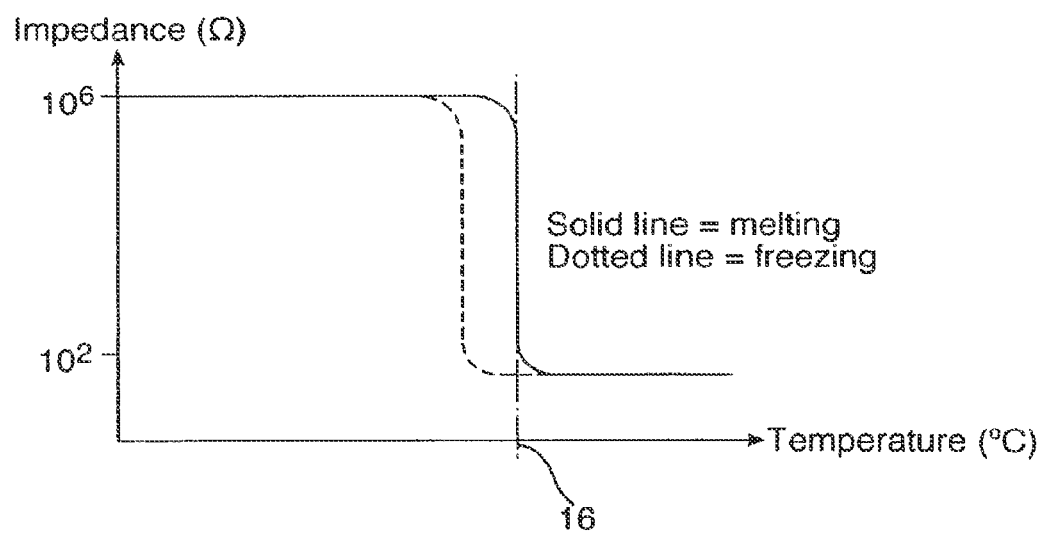
FIG. 2 is a graph showing an idealised change in impedance on melting of an ionic liquid used in the temperature switch of FIG. 1.

As indicated above, the conductivity of the ionic liquid 14 increases (the impedance decreases) as the ionic liquid 14 melts. FIG. 2 shows a desirable impedance profile of an ionic liquid as the ionic liquid melts. Preferably, as for the example given in FIG. 2, the decrease in impedance exhibited by the ionic liquid 14 at the melting point 16 is of considerable magnitude. A relatively high impedance in the solid state is desirable. Also, it is desirable for the decrease in impedance to occur as sharply as possible at the melting point. The impedance profile can be readily measured so as to assist in the selection of a preferred ionic liquid.

Another desirable feature of the ionic liquid is a relatively low viscosity when melted. Again viscosity can be easily measured so as to assist in the selection of a preferred ionic liquid. Low viscosity may be favoured by fluorinated anions such as hexafluorophosphate and tetrafluoroborate.

Further, the ionic liquid 14 should preferably be hydrophobic. To some extent, the hydrophobicity can be determined by selecting a suitable anion. For example, a halide anion tends to give an ionic liquid which has low hydrophobicity (i.e. has a high degree of water miscibility). When the anion is borate or a substituted form of borate, the hydrophobicity of the ionic liquid tends to be greater. Ionic liquids in which the anion is phosphate or a substituted form of phosphate are even more preferred, as these tend to give even greater degrees of hydrophobicity. Fluorinated borates and phosphates, such as tetrafluoroborate and hexafluorophosphate are particularly preferred anions as they give ionic liquids with very high hydrophobicities.

Preferred ionic liquids are also chemically and thermally stable. In particular, they should be then thermally stable to high temperatures. Preferably, they are thermally stable to at least 300° C. Ionic liquids in which the anion is tris-(pentafluoroethyl) trifluorophosphate are particularly preferred as this anion gives both high levels of hydrophobicity and also chemical stability.

Finally, preferred ionic liquids freeze (that is to say they change from their liquid state into their solid state) at a temperature which is similar to the melting point. This can be readily determined by trial and error. Preferably, the decrease in impedance seen on melting is fully reversible with the impedance increasing to its initial high value on re-freezing. A freezing point similar to the melting point is favoured by a crystalline structure in the solid state.

Taking the above considerations into mind, the most preferred cations are imidazolium and pyrrolidinium and substituted forms of these cations. The most preferred anions are hexafluorophosphate and tris-(pentafluoroethyl)trifluorophosphate. A particularly preferred ionic liquid is 1-methyl-tridecafluorooctyl-imidazolium hexafluorophosphate, which has a melting point of about 80° C. Another particularly preferred ionic liquid is 1,1-dimethyl-pyrrolidinium-tris-(pentafluoroethyl)-trifluorophosphate, which has a melting point of about 108'C.

Each end of the conductive sheath 10 is provided with a respective plug (not shown). Each plug seals its corresponding end of the sheath 10 so as to provide a fluid tight seal between the electrically conductive wire 12 and the electrically conductive sheath 10. The plugs (not shown) serve to retain the ionic liquid 14 within the conductive sheath 10. The plugs are made entirely or partially out of a non-electrically conductive material so that they do not provide an electrically conductive path between the wire 12 and the sheath 10. Also provision needs to be made for electrical interrogation of the sheath/wife assembly.

The sheath 10 may be made of any suitable electrically conductive material. Preferably, the material also is a good conductor of heat. Typically, the sheath 10 will be made of a metal. A preferred metal is stainless steel which is resistant to oxidation and chemical corrosion. The wire 12 may also be made of any suitable electrically conductive material. Typically, the wire 12 will be a metal. A preferred metal is corrosion resistant.

Preferably, the outside diameter of the sheath 10 is relatively small, for example 2 to 3 min, so as to maximise the ratio of the surface area of the sheath 10 to the internal volume. This helps to ensure that the ionic liquid 14 rapidly attains the external temperature. The temperature switch may be any desired length (for example between 1 cm and 10 meters or more) with the sheath 10, the conductive wire 12 and the ionic liquid 14 extending the full length of the temperature switch.

In order to assemble the temperature switch, the wire 12 is first positioned within the sheath 10 (with or without a porous spacing material). One end of the sheath 10 is then immersed in the ionic liquid 14 in its liquid state. A vacuum is then applied to the other end of the sheath 10 so as to draw the ionic liquid 14 into the sheath. After the ionic liquid 14 has solidified the sheath is sealed with the two end plugs.

In use, the temperature switch may be used to protect, for example, a machine or structure which may suffer damage above a threshold temperature. One such structure is the wing of a aeroplane. In order to remove ice which has formed on the wing of an aircraft, or to prevent the formation of ice, hot air from the aircraft's engine can be directed to flow over the surface of the aircraft wing at risk. The hot air melts or prevents the formation of ice. However, it is necessary to avoid heating the wing to too high a temperature, as this can damage the wing. Accordingly, the temperature switch described above may be used to protect the wing. The temperature switch is used to provide a warning signal when the temperature of the wing exceeds or is equal to a threshold temperature. This threshold temperature may be above the normal operating temperature of the wing, but below (so as to provide a safety margin) the lowest temperature at which damage may occur.

The temperature switch can be attached to the wing to be protected. It may be, for example, configured in a straight line or in a serpentine arrangement on the heated surface of the wing. The ionic liquid 14 of the temperature switch has been chosen so as to have a melting point corresponding to the threshold temperature.

The electrically conductive sheath 10 and the electrically conductive wire 12 act as electrical contacts in contact with the ionic liquid 14. The electrically conductive sheath 10 and the electrically conductive wire 12 are connected to suitable electronics (of a known type) suitable for measuring the conductivity or impedance of the ionic liquid 14 between the electrically conductive sheath 10 and the electrically conductive wire 12.

During normal operation, the temperature of the wing, and therefore the temperature of the temperature switch, does not exceed the threshold temperature. Accordingly, the ionic liquid 14 remains in its solid state and has a low conductivity (high impedance). However, should the wing be overheated, such that the wing temperature equals or exceeds the threshold temperature, then the ionic liquid 14 in the temperature switch will melt. At this point, the conductivity of the ionic liquid 14 increases greatly (that is to say the impedance decreases). This is detected by the electronics connected to the electrically conductive sheath 10 and the electrically conductive wire 12. On detecting the increase in conductivity, the electronics produce a warning signal which can be used to alert the pilot and to divert the hot air from the surface of the wing.

When the temperature of the wing has fallen back below the threshold temperature, the ionic liquid 14 solidifies and its conductivity decreases accordingly, and its impedance thus increases to the pre-threshold value, i.e. the ionic liquid resets. Again, this can be detected by the electronics.

As the ionic liquid is fully contained within the conductive sheath 10 and the two end plugs (not shown), there is no loss of the ionic liquid 14 while it is in its liquid state. Additionally, the ionic liquid is chosen such that its temperature stability is adequate for the application. This means that the temperature to which the ionic liquid is exposed does not reach the temperature at which the liquid undergoes chemical degeneration. Accordingly, once the ionic liquid has solidified the temperature switch is undamaged and ready to protect the wing from overheating again.

There are known temperature switches similar to the exemplary temperature switch described above and having a sheath and an inner wire. However, these known temperature switches use eutectic salt mixtures in place of the ionic liquid 14. The use of the ionic liquid 14 in temperature switches of this type facilitates the provision of such temperature switches which have a relatively low threshold temperature. Most eutectic salt mixtures have a melting point above 200° C. Although there are eutectic salt mixtures which have melting points below 200° C., these often prove problematic in temperature switches of the type described above for a number of reasons. For example, they may have an undesirably low chemically stability, they may be moisture sensitive or they may exhibit only a small change in conductivity on melting. Additionally, eutectic salt mixtures with melting points below 200° C. rarely demonstrate ideal impedance characteristics. On the other hand, ionic liquids having favourable characteristics and having melting points below 200° C. can be readily identified. In fact, it is possible to choose a suitable ionic liquid for almost any desired threshold temperature below 200° C.

It will be appreciated that the invention can be modified in a number of ways.

Instead of using the electrically conductive sheath 10 and the electrically conductive wire as the electrical contacts which make contact with the ionic liquid 14, any suitable electrical contacts may be used. In the examples described above, the electrically conductive sheath 10 acts as a container to contain the ionic liquid 14. However, this need not be the case and any suitable container may be used to contain the ionic liquid 14. The container need not be an electrical contact.

For example, in another embodiment, a tubular conductive sheath houses two conductive wires which are spaced from one another (i.e. not touching) and which extend through the sheath. One of the wires is electrically connected to the sheath while the other does not touch the sheath. An ionic liquid fills the sheath making contact with the sheath and with the two wires. When the ionic liquids melts, it becomes more conductive and so the electrical impedance between the sheath and the wire which is not connected to the sheath greatly decreases. This is detected by suitable electronics.

Alternatively, the two electrical contacts can be two electrical plates with a gap between them. The gap is filled with an ionic liquid.

Instead of using a single ionic liquid—that is to say a single organic cation in combination with a single anion, a mixture of different ionic liquids may be used. A mixture of different ionic liquids may have a depressed melting point (as compared to the component ionic liquids considered separately) and may have a reduced viscosity.

It will be appreciated that electronics may be used to measure any suitable electric characteristic which undergoes a change on melting of the ionic liquid. For example, the electronics may measure conductivity, impedance or capacitance.

The invention claimed is:

1. A temperature switch comprising:
    a material which melts at a predetermined temperature and concomitantly undergoes a change in an electrical characteristic at the predetermined temperature; and
    at least two electrical contacts for detecting the change in the electrical characteristic; wherein:
    the material comprises an organic cation and an anion;
    the cation is 1-methyl-tridecafluorooctyl-imidazolium;
    the change in the electrical characteristic occurs as the material melts; and
    the predetermined temperature is less than 200° C.

2. A temperature switch according to claim 1, wherein the predetermined temperature is less than or equal to 120° C.

3. A temperature switch according to claim 1, wherein the predetermined temperature is in the range of 80° C. to 120° C.

4. A temperature switch according to claim 1, wherein the anion is selected from the group consisting of: sulphate; substituted sulphate; sulphonate; substituted sulphonate; halides; amide; substituted amide; imide; substituted imide; tosylate; substituted tosylate; borate; substituted borate; phosphate; substituted phosphate; antimonate; substituted antimonate; carboxylate; and substituted carboxylate.

5. A temperature switch according to claim 1, wherein the anion is hexafluorophosphate.

6. A temperature switch according to claim 1, wherein the anion is tetrafluoroborate.

7. A temperature switch according to claim 1, wherein the electrical characteristic is conductivity, impedance, or capacitance.

8. A temperature switch according to claim 7, wherein the conductivity increases as the material melts.

9. A temperature switch according to claim 7, wherein the impedance decreases as the material melts.

10. A temperature switch comprising:
a material which melts at a predetermined temperature and concomitantly undergoes a change in an electrical characteristic at the predetermined temperature; and
at least two electrical contacts for detecting the change in the electrical characteristic; wherein:
the material comprises an organic cation and an anion;
the anion is tris-(pentafluoroethyl)-trifluorophosphate;
the change in the electrical characteristic occurs as the material melts; and
the predetermined temperature is less than 200° C.

11. A temperature switch according to claim 10, wherein the predetermined temperature is less than or equal to 120° C.

12. A temperature switch according to claim 10, wherein the predetermined temperature is in the range of 80° C. to 120° C.

13. A temperature switch according to claim 10, wherein the cation is selected from the group consisting of: imidazolium; substituted imidazolium; pyridinium; substituted pyridinium; pyrrolidinium; substituted pyrrolidinium; phosphonium; substituted phosphonium; ammonium; substituted ammonium; guanidinium; substituted guanidinium; uronium; substituted uronium; thiouronium; and substituted thiouronium.

14. A temperature switch according to claim 10, wherein the cation is imidazolium, substituted imidazolium, pyrrolidinium, or substituted pyrrolidinium.

15. A temperature switch according to claim 10, wherein the cation is 1,1-dimethyl-pyrrolidinium.

16. A temperature switch according to claim 10, wherein the electrical characteristic is conductivity, impedance, or capacitance.

17. A temperature switch according to claim 16, wherein the conductivity increases as the material melts.

18. A temperature switch according to claim 16, wherein the impedance decreases as the material melts.

* * * * *